United States Patent
Wu et al.

(10) Patent No.: US 9,655,161 B2
(45) Date of Patent: May 16, 2017

(54) AUXILIARY INFORMATION REPORTING AND INFORMATION SENDING METHOD AND DEVICE

(71) Applicant: China Academy of Telecommunications Technology, Beijing (CN)

(72) Inventors: Yumin Wu, Beijing (CN); Zhe Fu, Beijing (CN); Jiamin Liu, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/434,752

(22) PCT Filed: Oct. 30, 2013

(86) PCT No.: PCT/CN2013/086259
§ 371 (c)(1),
(2) Date: Apr. 9, 2015

(87) PCT Pub. No.: WO2014/067465
PCT Pub. Date: May 8, 2014

(65) Prior Publication Data
US 2015/0237671 A1 Aug. 20, 2015

(30) Foreign Application Priority Data
Nov. 5, 2012 (CN) .......................... 2012 1 0436486

(51) Int. Cl.
H04W 4/00 (2009.01)
H04W 76/04 (2009.01)
(Continued)

(52) U.S. Cl.
CPC .......... *H04W 76/043* (2013.01); *H04W 8/24* (2013.01); *H04W 36/0005* (2013.01); *H04W 92/10* (2013.01)

(58) Field of Classification Search
CPC .......... H04L 2012/5608; H04W 84/12; H04W 88/08; H04W 80/04; H04W 88/06;
(Continued)

(56) References Cited

U.S. PATENT DOCUMENTS 9,107,116 B2 * 8/2015 Susitaival ......... H04W 36/0055
9,161,278 B2 * 10/2015 Koo ..................... H04W 36/20
(Continued)

FOREIGN PATENT DOCUMENTS

CA     2 807 884 A1     2/2012
CN     1856152 A        11/2006
(Continued)

OTHER PUBLICATIONS

The Extended European Search Report issued on Oct. 23, 2015 in the EP counterpart application (13851417.9).
(Continued)

*Primary Examiner* — Brenda H Pham
(74) *Attorney, Agent, or Firm* — Kilpatrick Townsend & Stockton LLP

(57) ABSTRACT

The embodiments of this application relate to the field of wireless communications. Disclosed are an auxiliary information reporting and information sending method and device, so that a target base station can acquire the latest auxiliary information of a user equipment (UE) and then can provide the most reasonable configuration for the UE. In this application, the UE reports the auxiliary information to a source base station, and determines whether it is required to re-report the auxiliary information in a target cell; if determining that it is required to re-report the auxiliary informa-
(Continued)

tion in the target cell, the user equipment reports the auxiliary information to the target base station after being switched to the target cell. It can be seen that, in this solution, the target base station can acquire the latest auxiliary information of the UE, so as to provide the most reasonable configuration for the UE.

18 Claims, 3 Drawing Sheets

(51) Int. Cl.
*H04W 36/00* (2009.01)
*H04W 8/24* (2009.01)
*H04W 92/10* (2009.01)

(58) Field of Classification Search
CPC . H04W 84/18; H04W 36/18; H04W 36/0011; H04W 36/14; H04W 36/08
USPC .............................. 370/310.2, 328, 331, 338
See application file for complete search history.

(56) References Cited

U.S. PATENT DOCUMENTS

| | | |
|---|---|---|
| 2005/0286471 A1 | 12/2005 | Yang et al. |
| 2007/0224993 A1 | 9/2007 | Forsberg |
| 2007/0291695 A1 | 12/2007 | Sammour et al. |
| 2009/0022107 A1 | 1/2009 | Kapoor et al. |
| 2010/0278097 A1 | 11/2010 | Li et al. |
| 2012/0224525 A1* | 9/2012 | Wang .................... H04W 80/02 370/315 |
| 2012/0236776 A1 | 9/2012 | Zhang et al. |

FOREIGN PATENT DOCUMENTS

| | | |
|---|---|---|
| CN | 101998557 A | 3/2011 |
| CN | 102036324 A | 4/2011 |
| CN | 102421135 A | 4/2012 |
| CN | 102811450 A | 12/2012 |
| KR | 20120113673 A | 10/2012 |
| WO | 2012/092713 A1 | 7/2012 |

OTHER PUBLICATIONS

International Search Report for PCT/CN2013/086259.
3GPP TSG-RAN WG2 Meeting #77, R2-120065, Feb. 10, 2012..
3GPP TSG-RAN WG2 Meeting #78, R2-122913, May 25, 2012.
Office Action issued on Apr. 14, 2016 in the KR counterpart application (10-2015-7012898).
Office Action for Chinese Patent Appln. No. 201210436486.4 mailed Jul. 18, 2016, 9 pages.
Office Action for European Patent Appln. No. 13 851 417.9 mailed Jul. 26, 2016, 7 pages.
Pantech, "Considerations on PPI", 3GPP TSG-RAN WG2 Meeting #80, R2-125311, USA, New Orleans, Nov. 12-16, 2012, 4 pages.
Nokia Siemens Networks, Nokia Corporation, "IDC Signaling to Target eNB", 3GPP TSG-RAN WG2 Meeting #77bis Jeju, South Korea, Mar. 26-30, 2012, R2-121097, R2-115752, 2 pages.
Ericsson, St-Ericsson, "MBMS interest indication and RRC signaling details", 3GPP TSG-RAN WG2 #77bis, Jeju, South Korea, Mar. 26-30, 2012, R2-121560, 9 pages.

* cited by examiner

AUXILIARY INFORMATION REPORTING AND INFORMATION SENDING METHOD AND DEVICE

This application is a US National Stage of International Application No. PCT/CN2013/086259, filed on Oct. 30, 2013, designating the United States and claiming the priority to Chinese Patent Application No. 201210436486.4, filed with the Chinese Patent Office on Nov. 5, 2012 and entitled "Method and device for reporting auxiliary information and transmitting information", the content of which is hereby incorporated by reference in its entirety.

FIELD

The present invention relates to the field of wireless communications and particularly to a method and device for reporting auxiliary information and transmitting information.

BACKGROUND

Along with intensified studies on a Long Term Evolution-Advanced (LTE-A) system at a variety of layers, in order to improve the performance of a User Equipment (UE) and enhance the experience of a user, a mechanism for reporting auxiliary information of the UE has been introduced to a Radio Access Network (RAN) 2 in a number of fields, and an evolved Node-B (eNB) adjusts related configuration parameters according to the auxiliary information reported by the UE for the purpose of further optimized configuration. A report of auxiliary information by the UE has been currently introduced to the fields including an enhanced Diverse Data Application (eDDA), In-Device Coexistence (IDC), an enhanced Multimedia Broadcast Multicast Service (eMBMS), etc.

The related art and auxiliary information will be introduced below briefly, and generally a mechanism for reporting auxiliary information related to eDDA will be introduced, although auxiliary information reporting mechanisms related to other fields will be similar to the mechanism related to eDDA.

Along with the popularization of smart phones, there is a constantly growing demand of people for types of services that can be supported on the user equipment, and in view of this, a new Working Item (WI), i.e., an eDDA, has been introduced by the 3$^{rd}$ Generation Partnership Project (3GPP) in the LTE-A Release 11 (Rel-11) for the purpose of accommodating increasingly diversified services that can be supported by the user equipment to enhance the existing LTE-A system, to improve the performance of the LTE-A system, to save a signaling/resource overhead, to guarantee the user experience and power saving of the user equipment, etc. This technology is applicable to an Evolved Universal Terrestrial Radio Access Network (E-UTRAN) and the UE. In order to satisfy the requirement above on enhancement, both the UE and the network side need to know state information of each other if necessary. A background service and an Instant Message (IM) service are two types of services with the highest priority to be studied in an eDDA scenario and have gained popular attention in real applications due to their low amount of traffic and a variable burst data packet. Particularly the background service generally refers to a service with some small amount of data for maintaining a connection in an inactive state, and the IM service generally refers to Mobile QQ, Fetion and other services with a small data packet which may be transmitted in burst/frequently in a short time. In order to enable the network side to instantly and effectively obtain the characteristic of the service and know the preference of the user (for example, at this time the UE prefers to a power-saving mode or a better user experience mode), preferably the mechanism for reporting auxiliary information at the UE side is introduced to the RAN 2 in the eDDA scenario. This mechanism relates to reporting information currently including Power Preference Indication (PPI). The UE can report newly the changed information to the network when there is a change in state (e.g., a change in preference). The network side will transmit an indicator to the UE to indicate whether a report of auxiliary information is supported by the current cell. The UE can report auxiliary information accordingly to the eNB only upon detection of the indicator that the report is allowed.

In a handover procedure, a source eNB forwards PPI information to a destination eNB in a handover preparation procedure, so that the destination eNB can obtain the PPI of the UE, and provide radio resource configuration corresponding to the PPI of the UE, as soon as possible.

The eMBMS system broadcasts the same service in a Multimedia Broadcast multicast service Single Frequency Network (MBSFN) area including one or more cells for the purpose of saving system resources and enhancing reception of a signal by the UE. A mechanism for enhancing service continuity of Multimedia Broadcast Multicast Service (MBMS) has been introduced in the study on the eMBMS in the Rel-11, and for a UE in a connected state, the UE can report frequencies in which it is interested, and an order of priorities of MBMS and joint unicast services, in an MBMS Interest Indication message, so that the eNB configures the UE with the related frequencies in view of the interest reported by the UE, so that the UE can receive the MBMS service continuously.

In the handover procedure, the source eNB forwards the MBMS preference information of the UE in a connected state to the destination eNB in the handover preparation procedure, so that the destination eNB can obtain the MBMS preference information of the UE in the connected state, and provide the radio resource configuration corresponding to the preference of the UE, as soon as possible for the UE to receive continuously the MBMS service.

At present there are an increasing number of UEs equipped with a plurality of radio transceivers, such as Long Term Evolution (LTE) transceivers, WiFi transceivers, Bluetooth transceivers, or Global Navigation Satellite System (GNSS) receivers, etc. The study on the IDC is for the purpose of lowering coexistence interference between these radio transceivers to thereby provide the UE with higher radio transmission and reception performance. A mechanism for the UE to detect and report coexistence interference between the transceivers in the UE has been introduced to the existing IDC, and the eNB can configure the UE with more appropriate Radio Resource Management (RRM) configuration upon reception of the auxiliary information reported by the UE to thereby alleviate or eliminate coexistence interference between the transceivers in the UE.

In the handover procedure, the source eNB forwards the auxiliary information reported by the UE to the destination eNB in the handover preparation procedure, so that the destination eNB can obtain the auxiliary information of the UE, and provide the UE with the appropriate radio resource configuration, as soon as possible to thereby alleviate coexistence interference in the UE.

In summary, the auxiliary information reported by the UE will be forwarded by the source eNB to the destination eNB in the handover preparation procedure, but it is likely for the UE to further report the latest auxiliary information after the source eNB forwards the auxiliary information of the UE in the handover preparation procedure. The auxiliary information reported by the UE in this case will not be further forwarded by the source eNB to the destination eNB, so that the destination eNB can not obtain the latest auxiliary information of the UE and consequentially can not provide the UE with the most reasonable configuration.

SUMMARY

Embodiments of the invention provide a method and device for reporting auxiliary information and transmitting information so as to address such a problem that the destination base station can not obtain the latest auxiliary information of the UE and consequentially can not provide the UE with the most reasonable configuration.

An embodiment of the invention provides a method for reporting auxiliary information, the method including:

reporting, by a user equipment, auxiliary information to a source base station;

determining, by the user equipment, whether the auxiliary information needs to be reported newly in a destination cell; and if it is determined that the auxiliary information needs to be reported newly in the destination cell, then reporting, by the user equipment, the auxiliary information to a destination base station after the user equipment is switched to the destination cell.

An embodiment of the invention provides a method for transmitting information, the method including:

receiving, by a source base station, auxiliary information reported by an user equipment; and transmitting, by the source base station, information to the user equipment for the user equipment to determine whether the auxiliary information needs to be reported newly in a destination cell.

An embodiment of the invention provides a user equipment including:

a reporting unit configured to report auxiliary information to a source base station;

a determining unit configured to determine whether the auxiliary information needs to be reported newly in a destination cell; and a newly-reporting unit configured, if it is determined that the auxiliary information needs to be reported newly in the destination cell, to report the auxiliary information to a destination base station after the user equipment is switched to the destination cell.

An embodiment of the invention provides a base station including:

a receiving unit configured to receive auxiliary information reported by an user equipment; and a transmitting unit configured to transmit information to the user equipment for the user equipment to determine whether the auxiliary information needs to be reported newly in a destination cell.

In the solutions according to the embodiments of the invention, the user equipment reports the auxiliary information to the source base station, the user equipment determines whether the auxiliary information needs to be reported newly in the destination cell, and if the user equipment determines that the auxiliary information needs to be reported newly in the destination cell, then the user equipment reports the auxiliary information to the destination base station after being switched to the destination cell.

Apparently in this solution, the user equipment needs to judge whether the auxiliary information reported to the source base station needs to be reported newly in the destination cell, and if so, then the user equipment reports the auxiliary information to the destination base station in the destination cell, so that the destination base station can obtain the latest auxiliary information of the UE to provide the UE with the most reasonable configuration.

DETAILED DESCRIPTION OF THE EMBODIMENTS

In order to address such a problem that a destination base station can not obtain the latest auxiliary information of a UE and consequentially can not provide the UE with the most reasonable configuration, embodiments of the invention provide a method for reporting auxiliary information and a method for transmitting information.

Figure 1:
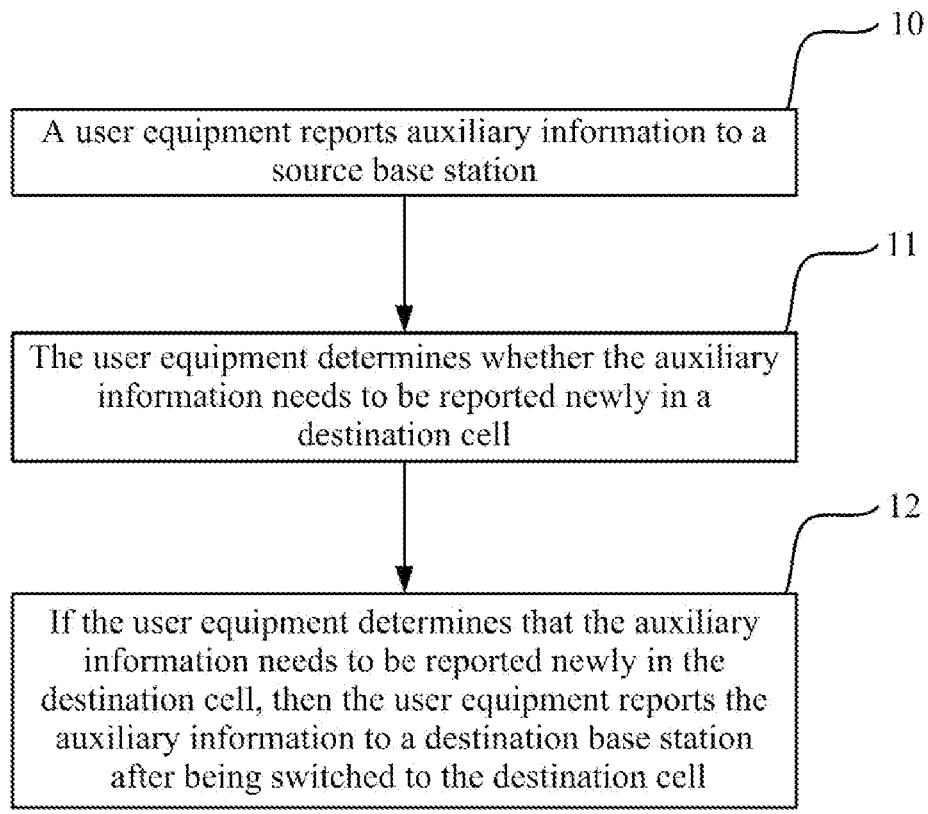
FIG. 1 illustrates a schematic flow chart of a method according to an embodiment of the invention.

Referring to FIG. 1, a method for reporting auxiliary information according to an embodiment of the invention includes the following operations:

In the operation 10, a user equipment reports auxiliary information to a source base station and particularly reports the auxiliary information to the source base station before reception of a handover command transmitted by the source base station; and here the auxiliary information refers to information assisting the network side in configuring the user equipment, and the auxiliary information can particularly include auxiliary information of an eDDA (e.g., PPI information) or auxiliary information of an eMBMS (e.g., MBMS interest information) or auxiliary information of IDC (e.g., detection information of coexistence interference between transceivers) or other auxiliary information from the user equipment;

In the operation 11, the user equipment determines whether the auxiliary information needs to be reported newly in a destination cell; and In the operation 12, if the user equipment determines that the auxiliary information needs to be reported newly in the destination cell, then the user equipment reports the auxiliary information to a destination base station after being switched to the destination cell.

In the operation 11, the user equipment can determine whether the auxiliary information needs to be reported newly in the destination cell particularly in one of the following six approaches:

In a first approach, the user equipment receives indication signaling transmitted by the source base station, where the indication signaling indicates whether the auxiliary information reported by the user equipment to the source base station before the source base station transmits a handover command (particularly before the source base station transmits the handover command to the user equipment) is forwarded by the source base station to the destination base station, or indicates whether the user equipment needs to report newly the lastly reported auxiliary information in the destination cell; and the user equipment determines from the indication signaling whether the lastly reported auxiliary information needs to be reported newly in the destination cell;

Particularly if the indication signaling transmitted by the source base station indicates that the auxiliary information reported by the user equipment to the source base station before the source base station transmits the handover command is forwarded by the source base station to the destination base station, then the user equipment determines that the auxiliary information does not need to be reported newly in the destination cell; otherwise, the user equipment determines that the auxiliary information needs to be reported newly in the destination cell; or If the indication signaling transmitted by the source base station indicates that the user equipment needs to report newly the lastly reported auxiliary information in the destination cell, then the user equipment determines that the auxiliary information lastly reported to the source base station needs to be reported newly in the destination cell; otherwise, the user equipment determines that the auxiliary information lastly reported to the source base station does not need to be reported newly in the destination cell. Correspondingly in the operation 12, if the user equipment determines that the auxiliary information lastly reported to the source base station needs to be reported newly in the destination cell, then the user equipment reports the auxiliary information, lastly reported to the source base station, to the destination base station after being switched to the destination cell.

In a second approach, the user equipment starts an auxiliary information forward judgment timer according to configuration information of the auxiliary information forward judgment timer after the auxiliary information is reported to the source base station; and the user equipment judges whether the auxiliary information forward judgment timer expires upon reception of the handover command transmitted by the source base station, and if the timer expires, then the user equipment determines that the auxiliary information does not need to be reported newly in the destination cell; otherwise, the user equipment determines that the auxiliary information needs to be reported newly in the destination cell.

In a third approach, if the reported auxiliary information is auxiliary information reported by the user equipment after a handover measurement report is made to the source base station and before the handover command transmitted by the source base station is received, then the user equipment determines that the auxiliary information needs to be reported newly in the destination cell; otherwise, the user equipment determines that the auxiliary information does not need to be reported newly in the destination cell.

In a fourth approach, if the reported auxiliary information is auxiliary information reported by the user equipment after a handover measurement report has been made to the source base station for a preset period of time and before the handover command transmitted by the source base station is received, then the user equipment determines that the auxiliary information needs to be reported newly in the destination cell; otherwise, the user equipment determines that the auxiliary information does not need to be reported newly in the destination cell.

In a fifth approach, the user equipment determines whether the difference between a point of time when the handover command is received, and a point of time when the auxiliary information is reported to the source base station is less than a preset value of time, and if so, then the user equipment determines that the auxiliary information needs to be reported newly in the destination cell; otherwise, the user equipment determines that the auxiliary information does not need to be reported newly in the destination cell.

In a sixth approach, the user equipment receives a point of time, transmitted by the source base station, when the source base station transmits a handover request to the destination base station; and the user equipment judges whether a point of time when the auxiliary information is transmitted to the source base station is later than the point of time when the source base station transmits the handover request to the destination base station, and if so, then the user equipment determines that the auxiliary information needs to be reported newly in the destination cell; otherwise, the user equipment determines that the auxiliary information does not need to be reported newly in the destination cell.

Furthermore in the second approach, if the user equipment has made the handover measurement report to the source base station before reporting the auxiliary information to the source base station, then the user equipment starts the auxiliary information forward judgment timer according to the configuration information of the auxiliary information forward judgment timer and performs the subsequent operations; otherwise, the user equipment does not start the auxiliary information forward judgment timer.

Particularly in the first approach, the user equipment receives one piece of indication signaling transmitted by the source base station, where the indication signaling indicates whether the respective pieces of auxiliary information reported by the user equipment to the source base station before the source base station transmits the handover command are forwarded by the source base station to the destination base station, or indicates whether the user equipment needs to report newly the lastly reported respective pieces of auxiliary information in the destination cell; or The user equipment receives a plurality of pieces of indication signaling transmitted by the source base station, where each piece of indication signaling indicates respectively whether the piece of auxiliary information reported by the user equipment to the source base station before the source base station transmits the handover command is forwarded by the source base station to the destination base station, or indicates whether the user equipment needs to report newly the lastly reported piece of auxiliary information in the destination cell.

The indication signaling can particularly be carried in existing signaling (e.g., an RRC Connection Reconfiguration message together with the handover command) or carried in separate newly-defined signaling.

Particularly in the second approach, the configuration information of the auxiliary information forward judgment timer is transmitted in advance by the source base station to the user equipment or defined by a protocol; and the configuration information can include a timing length of the auxiliary information forward judgment timer and also other timer related information.

In the fourth approach, the length of time of the preset period of time is transmitted in advance by the source base station to the user equipment or defined by a protocol.

In the fifth approach, the preset value of time is transmitted in advance by the source base station to the user equipment or defined by a protocol.

Particularly the configuration information of the auxiliary information forward judgment timer is transmitted in advance by the source base station to the user equipment in broadcast signaling or dedicated signaling (e.g., an RRC Connection Reconfiguration message);

The length of time of the preset period of time is transmitted in advance by the source base station to the user equipment in broadcast signaling or dedicated signaling (e.g., an RRC Connection Reconfiguration message); and The preset value of time is transmitted in advance by the source base station to the user equipment in broadcast signaling or dedicated signaling (e.g., an RRC Connection Reconfiguration message).

Particularly in the sixth approach, the point of time when the source base station transmits the handover request to the destination base station is transmitted by the source base station to the user equipment in dedicated signaling (e.g., an RRC Connection Reconfiguration message) or new RRC signaling.

Preferably before the user equipment reports the auxiliary information to the source base station, the user equipment can report auxiliary information related capability indication information to the source base station to notify the source base station of whether the user equipment has the capability to report the auxiliary information.

Figure 2:
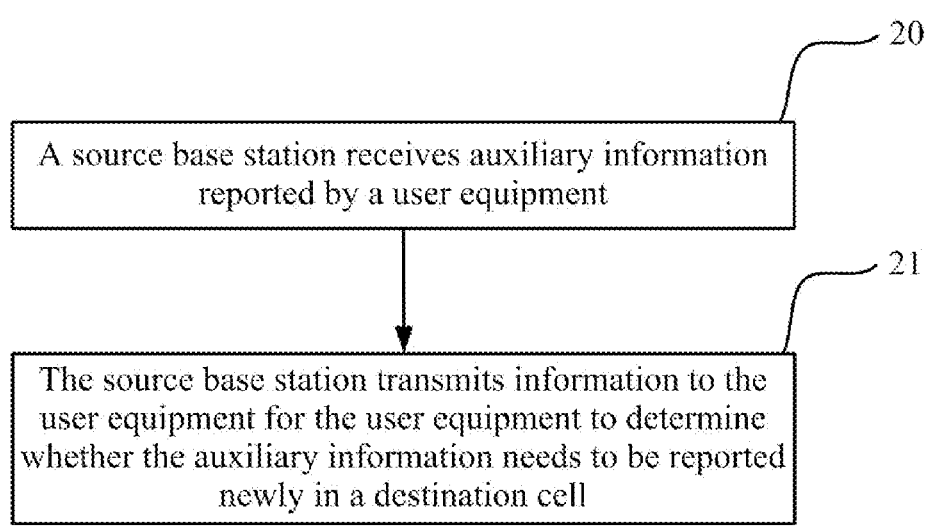
FIG. 2 illustrates a schematic flow chart of another method according to an embodiment of the invention.

Referring to FIG. 2, a method for transmuting information according to an embodiment of the invention includes the following operations:

In the operation 20, a source base station receives auxiliary information reported by a user equipment; and In the operation 21, the source base station transmits information to the user equipment for the user equipment to determine whether the auxiliary information needs to be reported newly in a destination cell.

It shall be noted that the operation 20 and the operation 21 may not be performed in a strict temporal order, but the operation 21 can alternatively be performed before the operation 20.

In the operation 21, the source base station can transmit the information to the user equipment for the user equipment to determine whether the auxiliary information needs to be reported newly in the destination cell, particularly as follows:

The source base station transmits indication signaling to the user equipment, upon reception of a handover command transmitted by a destination base station, to indicate whether the respective pieces of auxiliary information reported by the user equipment to the source base station before the source base station transmits the handover command (particularly before the source base station transmits the handover command to the user equipment) is forwarded by the source base station to the destination base station, or to indicate whether the user equipment needs to report newly the lastly reported auxiliary information in the destination cell; or The source base station transmits configuration information of an auxiliary information forward judgment timer to the user equipment, so that the user equipment starts the auxiliary information forward judgment timer according to the configuration information after the auxiliary information is reported, and determines whether the auxiliary information needs to be reported newly in the destination cell dependent upon whether the auxiliary information forward judgment timer expires upon reception of a handover command; or The source base station transmits information about the length of time of a preset period of time to the user equipment, so that the user equipment determines whether the auxiliary information needs to be reported newly in the destination cell dependent upon whether the auxiliary information is reported after the handover measurement report has been made to the source base station for the preset period of time and before a handover command transmitted by the source base station is received; or The source base station transmits a preset value of time to the user equipment, so that the user equipment determines whether the auxiliary information needs to be reported newly in the destination cell dependent upon whether the difference between a point of time when a handover command is received, and a point of time when the auxiliary information is reported to the source base station is less than the preset value of time; or The source base station transmits to the user equipment a point of time when the source base station transmits a handover request to the destination base station, after the handover request is transmitted to the destination base station, so that the user equipment determines whether the auxiliary information needs to be reported newly in the destination cell dependent upon whether a point of time when the auxiliary information is transmitted to the source base station is later than the point of time when the source base station transmits the handover request to the destination base station.

Particularly the source base station transmits the indication signaling to the user equipment by transmitting one piece of indication signaling, which indicates whether the respective pieces of auxiliary information reported by the user equipment to the source base station before the source base station transmits the handover command are forwarded by the source base station to the destination base station, or indicates whether the user equipment needs to report newly the lastly reported respective pieces of auxiliary information in the destination cell; or The source base station transmits the indication signaling to the user equipment by transmitting a plurality of pieces of indication signaling, each of which indicates respectively whether the piece of auxiliary information reported by the user equipment to the source base station before the source base station transmits the handover command is forwarded by the source base station to the destination base station, or indicates whether the user equipment needs to report newly the lastly reported piece of auxiliary information in the destination cell.

The indication signaling can particularly be carried in existing signaling (e.g., an RRC Connection Reconfiguration message together with the handover command) or carried in separate newly-defined signaling.

Particularly the configuration information of the auxiliary information forward judgment timer is transmitted by the source base station to the user equipment in broadcast signaling or dedicated signaling (e.g., an RRC Connection Reconfiguration message); and the configuration information can include a timing length of the auxiliary information forward judgment timer and also other timer related information;

The length of time of the preset period of time is transmitted by the source base station to the user equipment in broadcast signaling or dedicated signaling (e.g., an RRC Connection Reconfiguration message);

The preset value of time is transmitted by the source base station to the user equipment in broadcast signaling or dedicated signaling (e.g., an RRC Connection Reconfiguration message); and The point of time when the source base station transmits the handover request to the destination base station is transmitted by the source base station to the user equipment in dedicated signaling (e.g., an RRC Connection Reconfiguration message) or new RRC signaling.

Preferably before the source base station transmits the information to the user equipment for the user equipment to determine whether the auxiliary information needs to be reported newly in the destination cell, the source base station receives auxiliary information related capability indication information reported by the user equipment, and determines that the user equipment has the capability to report the auxiliary information according to the auxiliary information related capability indication information or when the user equipment has ever reported the auxiliary information. If the source base station determines that the user equipment does not have the capability to report the auxiliary information, according to the auxiliary information related capability indication information reported by the user equipment or when the user equipment has never reported the auxiliary information, then the source base station does not transmit the information to the user equipment for the user equipment to determine whether the auxiliary information needs to be reported newly in the destination cell.

In this method, the auxiliary information can include auxiliary information of an eDDA (e.g., PPI information) or auxiliary information of an eMBMS (e.g., MBMS interest information) or auxiliary information of IDC (e.g., detection information of coexistence interference between transceivers) or other auxiliary information from the UE.

The invention will be described below in particular embodiments thereof:

First Embodiment

In an inter-eNB handover procedure, a source eNB notifies in dedicated signaling a UE of whether lastly reported auxiliary information is forwarded to a destination eNB.

In the operation 1, the UE reports auxiliary information (PPI) of an eDDA according to its power consumption requirement, and the UE reports new auxiliary information (new PPI) of the eDDA when there is a change in content of the auxiliary information.

In the operation 2, the source eNB transmits corresponding handover request information to the destination eNB, and also forwards the auxiliary information (PPI) reported by the UE to the destination eNB in S1 or X2 interface signaling, in a handover preparation procedure.

In the operation 3, the UE newly reports new auxiliary information in a source cell due to a change in content of the auxiliary information after the source eNB forwards the auxiliary information. The UE may make a number of reports in the handover preparation procedure.

In the operation 4, the destination eNB makes an admission decision to judge whether a handover request of the UE can be admitted upon reception of the handover request information of the source eNB. If the handover request is admitted, then the destination eNB transmits appropriate configuration (e.g., RRM configuration) for the UE to the source eNB in S1 or X2 interface signaling in the handover preparation procedure according to the auxiliary information of the UE forwarded by the source eNB. A handover command is also transmitted to the source eNB.

In the operation 5, the source eNB notifies in explicit signaling the UE of whether the auxiliary information of the eDDA reported by the UE before the source eNB transmits the handover command is forwarded, upon reception of the handover command of the destination eNB.

In the operation 6, if the UE receives a forward indication, then the UE reports newly the auxiliary information of the eDDA lastly reported in the source cell, after the handover is finished or in a handover completion command.

Processes of forwarding auxiliary information of an MBMS and IDC can be performed similarly to this embodiment, so a detailed description thereof will be omitted here. In the even that a plurality of pieces of auxiliary information are reported together, the eNB can transmit forward/retransmission indication of each piece of auxiliary information separately or transmit forward/retransmission indication of all the auxiliary information together in a piece of signaling (e.g., 1 bit) in a similar process to the process here, so a detailed description thereof will be omitted here.

Second Embodiment

In an intra-eNB handover procedure, a source eNB notifies in dedicated signaling a UE of whether lastly reported auxiliary information is forwarded to a destination eNB.

In the operation 1, the UE reports auxiliary information (PPI) of an eDDA according to its power consumption requirement, and the UE reports new auxiliary information (new PPI) of the eDDA when there is a change in content of the auxiliary information.

In the operation 2, the UE newly reports new auxiliary information in a source cell due to a change in content of the auxiliary information. The UE may make a number of reports in the source cell.

In the operation 3, the source eNB judges that the current handover is an intra-eNB handover, and notifies in explicit signaling the UE that the auxiliary information of the eDDA lastly reported by the UE in the source cell does not need to be reported in a destination cell.

In the operation 4, if the UE receives the indication that the auxiliary information does not need to be retransmitted, then the UE will not report newly the auxiliary information of the eDDA lastly reported in the source cell after being switched.

Processes of forwarding auxiliary information of an MBMS and IDC can be performed similarly to this embodiment, so a detailed description thereof will be omitted here. In the even that a plurality of pieces of auxiliary information are reported together, the eNB can transmit forward/retransmission indication of each piece of auxiliary information separately or transmit forward/retransmission indication of all the auxiliary information together in a piece of signaling (e.g., 1 bit) in a similar process to the process here, so a detailed description thereof will be omitted here.

Third Embodiment

An eNB transmits configuration information of an auxiliary information forward judgment timer to a UE in dedicated signaling.

In the operation 1, the UE with the capability to report auxiliary information of an eDDA reports auxiliary information related capability indication information.

In the operation 2, the eNB transmits configuration information of an auxiliary information forward judgment timer in dedicated signaling after obtaining the auxiliary information related capability indication information of the UE. The configuration information includes a timing length of time of the timer and other configuration information.

In the operation 3, the UE reports auxiliary information (PPI) of the eDDA according to its power consumption requirement, and the UE reports new auxiliary information (new PPI) of the eDDA when there is a change in content of the auxiliary information.

In the operation 4, the UE starts/restarts the auxiliary information forward judgment timer according to the configuration information transmitted by the eNB each time the auxiliary information of the eDDA is reported.

In the operation 5, the source eNB transmits a handover request to a destination eNB in a handover preparation procedure. The destination eNB makes an admission decision to judge whether to accept the handover request, and if the handover is accepted, then the destination eNB transmits a handover command to the source eNB. The source eNB transmits a handover command to the UE upon reception of the handover command from the destination eNB.

In the operation 6, if the auxiliary information forward judgment timer corresponding to the auxiliary information of the eDDA does not expire when the UE receives the handover command, then the UE determines that the auxiliary information of the eDDA needs to be reported newly in a destination cell after being switched. If the timer expires, then the UE determines that the auxiliary information of the eDDA does not need to be reported newly in the destination cell after being switched.

An IDC auxiliary information process is similar to this process, so a repeated description thereof will be omitted here. In an MBMS auxiliary information process, since the UE may not report the capability indication information, then the eNB can judge whether the UE has the capability to report the auxiliary information dependent upon whether the UE has reported the auxiliary information, or transmit the configuration information of the auxiliary information forward judgment timer to the UE in the event that the UE does not report any capability or capability related indication, in a similar process, so a repeated description thereof will be omitted here. When the timer is configured as specified by a protocol (not configured by the network), the UE does not need to be configured by the network with the auxiliary information forward judgment timer but starts the auxiliary information forward judgment timer directly as specified by the protocol, and the remaining operations are similar to the process in this embodiment, so a repeated description thereof will be omitted here.

Fourth Embodiment

An eNB transmits configuration information of an auxiliary information forward judgment timer to a UE in dedicated signaling, based on a measurement report.

In the operation 1, the UE with the capability to report auxiliary information of an eDDA reports auxiliary information related capability indication information.

In the operation 2, the eNB transmits configuration information of an auxiliary information forward judgment timer in dedicated signaling after obtaining the capability indication of the UE. The configuration information includes a timing length of the timer and other configuration.

In the operation 3, the UE reports auxiliary information (PPI) of the eDDA according to its power consumption requirement, and the UE reports new auxiliary information (new PPI) of the eDDA when there is a change in content of the auxiliary information.

In the operation 4, if the UE has made a handover measurement report before the auxiliary information of the eDDA is reported, then the UE starts/restarts the auxiliary information forward judgment timer according to the configuration information transmitted by the eNB each time the auxiliary information of the eDDA is subsequently reported.

In the operation 5, the source eNB transmits a handover request to a destination eNB in a handover preparation procedure. The destination eNB makes an admission decision to judge whether to accept the handover request, and if the handover is accepted, then the destination eNB transmits a handover command to the source eNB. The source eNB transmits a handover command to the UE upon reception of the handover command from the destination eNB.

In the operation 6, if the auxiliary information forward judgment timer corresponding to the auxiliary information of the eDDA does not expire when the UE receives the handover command, then the UE determines that the auxiliary information of the eDDA needs to be reported newly in a destination cell after being switched. If the timer expires, then the UE determines that the auxiliary information of the eDDA does not need to be reported newly in the destination cell after being switched.

An IDC auxiliary information process is similar to this process, so a repeated description thereof will be omitted here. In an MBMS auxiliary information process, since the UE may not report the capability indication information, then the eNB can judge whether the UE has the capability to report the auxiliary information dependent upon whether the UE has reported the auxiliary information, or transmit the configuration information of the auxiliary information forward judgment timer to the UE in the event that the UE does not report any capability or capability related indication, in a similar process, so a repeated description thereof will be omitted here. When the timer is configured as specified by a protocol (not configured by the network), the UE does not need to be configured by the network with the auxiliary information forward judgment timer but starts the auxiliary information forward judgment timer directly as specified by the protocol, and the remaining operations are similar to the process in this embodiment, so a repeated description thereof will be omitted here.

Fifth Embodiment an eNB configures an auxiliary information forward judgment timer in a broadcast manner.

In the operation 1, the eNB transmits configuration information of an auxiliary information forward judgment timer directly in broadcast information. The configuration information includes a timing length of the timer and other configuration.

In the operation 2, the UE reports auxiliary information (PPI) of eDDA according to its power consumption requirement, and the UE reports new auxiliary information (new PPI) of the eDDA when there is a change in content of the auxiliary information.

In the operation 3, the UE fetches the configuration information of the auxiliary information forward judgment timer in the corresponding broadcast information and starts/restarts the auxiliary information forward judgment timer according to the configuration information broadcasted by the eNB each time the auxiliary information of the eDDA is reported.

In the operation 4, the source eNB transmits a handover request to a destination eNB in a handover preparation procedure. The destination eNB makes an admission decision to judge whether to accept the handover request, and if the handover is accepted, then the destination eNB transmits a handover command to the source eNB. The source eNB transmits a handover command to the UE upon reception of the handover command from the destination eNB.

In the operation 5, if the auxiliary information forward judgment timer corresponding to the auxiliary information of the eDDA does not expire when the UE receives the handover command, then the UE determines that the auxiliary information of the eDDA needs to be reported newly in a destination cell after being switched. If the timer expires, then the UE determines that the auxiliary information of the eDDA does not need to be reported newly in the destination cell after being switched.

Since the eNB notifies the UE of the configuration information of the auxiliary information forward judgment timer in broadcast signaling without any need of auxiliary information capability information or related indication corresponding to the UE, processes similar to this embodiment can be performed for IDC and an MBMS, so a detailed description thereof will be omitted here. When the timer is configured as specified by a protocol (not configured by the network), the UE does not need to be configured by the network with the auxiliary information forward judgment timer but starts the auxiliary information forward judgment timer directly as specified by the protocol, and the remaining operations are similar to the process in this embodiment, so a repeated description thereof will be omitted here.

Sixth Embodiment an eNB configures an auxiliary information forward judgment timer in a broadcast manner, based on a measurement report.

In the operation 1, the eNB transmits configuration information of an auxiliary information forward judgment timer directly in broadcast information. The configuration information includes a timing length of the timer and an on or off state of the timer.

In the operation 2, the UE reports auxiliary information (PPI) of eDDA according to its power consumption requirement, and the UE reports new auxiliary information (new PPI) of the eDDA when there is a change in content of the auxiliary information.

In the operation 3, the UE fetches the configuration information of the auxiliary information forward judgment timer in the corresponding broadcast information. If the UE has made a handover measurement report before the auxiliary information of the eDDA is reported, then the UE starts/restarts the auxiliary information forward judgment timer according to the configuration information broadcasted by the eNB each time the auxiliary information of the eDDA is subsequently reported.

In the operation 4, the source eNB transmits a handover request to a destination eNB in a handover preparation procedure. The destination eNB makes an admission decision to judge whether to accept the handover request, and if the handover is accepted, then the destination eNB transmits a handover command to the source eNB. The source eNB transmits a handover command to the UE upon reception of the handover command from the destination eNB.

In the operation 5, if the auxiliary information forward judgment timer corresponding to the auxiliary information of the eDDA does not expire when the UE receives the handover command, then the UE determines that the auxiliary information of the eDDA needs to be reported newly in a destination cell after being switched. If the timer expires, then the UE determines that the auxiliary information of the eDDA does not need to be reported newly in the destination cell after being switched.

Since the eNB notifies the UE of the configuration information of the auxiliary information forward judgment timer in broadcast signaling without any need of auxiliary information capability information or related indication corresponding to the UE, processes similar to this embodiment can be performed for IDC and an MBMS, so a detailed description thereof will be omitted here. When the timer is configured as specified by a protocol (not configured by the network), the UE does not need to be configured by the network with the auxiliary information forward judgment timer but starts the auxiliary information forward judgment timer directly as specified by the protocol, and the remaining operations are similar to the process in this embodiment, so a repeated description thereof will be omitted here.

Seventh Embodiment it is judged whether auxiliary information is forwarded, dependent upon a handover measurement report.

In the operation 1, a UE reports auxiliary information (PPI) of eDDA according to its power consumption requirement, and the UE reports new auxiliary information (new PPI) of the eDDA when there is a change in content of the auxiliary information.

In the operation 2, the UE makes a handover measurement report to an eNB after a handover measurement report condition is satisfied (for example, A3 and B2 are configured, and the report condition is satisfied). The UE makes a decision about whether the auxiliary information is forwarded, when the UE makes the handover measurement report. Particularly if the UE makes the handover measurement report at a moment t, then the UE determines that the auxiliary information reported by the UE in a period of time from the moment t until a handover command is received, is not forwarded. The UE needs to report the auxiliary information after being switched to a destination cell.

Processes similar to this embodiment can be performed for IDC and an MBMS, so a detailed description thereof will be omitted here.

Eighth Embodiment it is judged whether auxiliary information is forwarded, dependent upon a configured wait period-of-time of a handover measurement report.

In the operation 1, a UE reports auxiliary information (PPI) of eDDA according to its power consumption requirement, and the UE reports new auxiliary information (new PPI) of the eDDA when there is a change in content of the auxiliary information.

In the operation 2, the UE obtains a wait period t1 of time by fetching it from broadcast information (without any need of auxiliary information capability information or related indication corresponding to the UE) or network-side dedicated signaling (e.g., RRC reconfiguration signaling), and with this configuration parameter, the UE determines whether the auxiliary information is forwarded, after a handover measurement report has been made for the period t1 of time.

In the operation 3, the UE makes the handover measurement report to an eNB after a handover measurement report condition is satisfied (for example, A3 and B2 are configured, and the report condition is satisfied). The UE makes a decision about whether the auxiliary information is forwarded, after a handover measurement report has been made for a period of time (i.e., a wait period of time). Particularly if the UE makes the handover measurement report at a moment t, then the UE determines that the auxiliary information reported by the UE in a period of time from the moment t+t1 until a handover command is received, is not forwarded. The UE needs to report the auxiliary information after being switched to a destination cell.

Processes similar to this embodiment can be performed for IDC and an MBMS, so a detailed description thereof will be omitted here.

Ninth Embodiment it is judged whether auxiliary information is forwarded, dependent upon a difference in time.

In the operation 1, a UE with the capability to report auxiliary information of an eDDA reports auxiliary information related capability indication information.

In the operation 2, an eNB transmits a preset period of time (T) for calibration in dedicated signaling after obtaining the capability indication of the UE. The UE is configured to report PPI information.

In the operation 3, the UE reports auxiliary information (PPI) of the eDDA according to its power consumption requirement, and the UE reports new auxiliary information (new PPI) of the eDDA when there is a change in content of the auxiliary information. The UE also records temporal information (t1) of the lastly reported PPI.

In the operation 4, the UE records a point of time (t2) when a handover command is received upon reception of the handover command from the source eNB. The UE calculates the difference in time (t2−t1). If the difference in time is less than a preset value (T), then the UE determines that the reported auxiliary information is not forwarded. The UE needs to report the auxiliary information after being switched to a destination cell.

Processes similar to this embodiment can be performed for IDC and an MBMS, so a detailed description thereof will be omitted here.

Tenth Embodiment it is judged whether auxiliary information is forwarded, dependent upon an indicated point of time of a handover request.

In the operation 1, a UE with the capability to report auxiliary information of an eDDA reports auxiliary information related capability indication information.

In the operation 2, an eNB configures the UE to report PPI information.

In the operation 3, the UE reports auxiliary information (PPI) of the eDDA according to its power consumption requirement, and the UE reports new auxiliary information (new PPI) of the eDDA when there is a change in content of the auxiliary information. The UE records temporal information (t1) about when the auxiliary information is transmitted.

In the operation 4, the eNB transmits temporal information (t2) about when a handover request is transmitted, to the UE in dedicated signaling after transmitting the handover request to a destination eNB upon obtaining the capability indication of the UE.

In the operation 5, the UE receives from the source eNB the temporal information about when the handover request is transmitted, and if (t1>t2), then the UE determines that the PPI is not forwarded. The UE needs to report the auxiliary information after being switched to a destination cell.

Processes similar to this embodiment can be performed for IDC and an MBMS, so a detailed description thereof will be omitted here.

Based upon the same inventive idea, an embodiment of the invention further provides a user equipment, and since the user equipment addresses the problem under a principle similar to the method for reporting auxiliary information according to the embodiment of the invention, reference can be made to the implementation of the method for an implementation of the user equipment, so a repeated description thereof will be omitted here.

Figure 3:
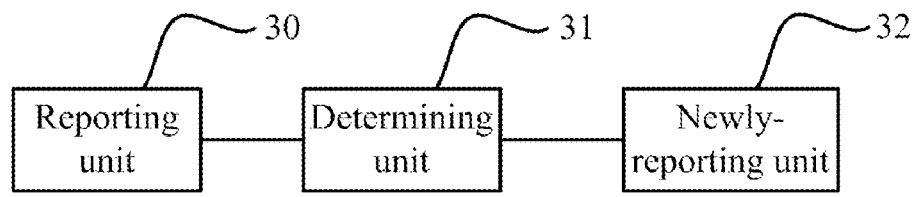
FIG. 3 illustrates a schematic structural diagram of a first user equipment according to an embodiment of the invention.

Referring to FIG. 3, an embodiment of the invention provides a user equipment including:

A reporting unit 30 is configured to report auxiliary information to a source base station;

A determining unit 31 is configured to determine whether the auxiliary information needs to be reported newly in a destination cell; and A newly-reporting unit 32 is configured, if it is determined that the auxiliary information needs to be reported newly in the destination cell, to report the auxiliary information to a destination base station after the user equipment is switched to the destination cell.

Furthermore the determining unit 31 is configured to determine whether the auxiliary information needs to be reported newly in the destination cell in one of the following six approaches:

In a first approach, the determining unit receives indication signaling transmitted by the source base station, where the indication signaling indicates whether the auxiliary information reported by the user equipment to the source base station before the source base station transmits a handover command is forwarded by the source base station to the destination base station, or indicates whether the user equipment needs to report the lastly reported auxiliary information newly in the destination cell; and the determining unit determines from the indication signaling whether the auxiliary information needs to be reported newly in the destination cell;

In a second approach, the determining unit starts an auxiliary information forward judgment timer according to configuration information of the auxiliary information forward judgment timer after the auxiliary information is reported to the source base station; and judges whether the auxiliary information forward judgment timer expires when a handover command transmitted by the source base station is received, and if the timer expires, then the determining unit determines that the auxiliary information does not need to be reported newly in the destination cell; otherwise, the determining unit determines that the auxiliary information needs to be reported newly in the destination cell;

In a third approach, if the auxiliary information is auxiliary information reported by the user equipment after a handover measurement report is made to the source base station and before a handover command transmitted by the source base station is received, then the determining unit determines that the auxiliary information needs to be reported newly in the destination cell; otherwise, the determining unit determines that the auxiliary information does not need to be reported newly in the destination cell;

In a fourth approach, if the auxiliary information is auxiliary information reported by the user equipment after a handover measurement report has been made to the source base station for a preset period of time and before a handover command transmitted by the source base station is received, then the determining unit determines that the auxiliary information needs to be reported newly in the destination cell; otherwise, the determining unit determines that the auxiliary information does not need to be reported newly in the destination cell;

In a fifth approach, the determining unit judges whether a difference between a point of time when a handover command is received, and a point of time when the auxiliary information is reported to the source base station is less than a preset value of time, and if so, then the determining unit determines that the auxiliary information needs to be reported newly in the destination cell; otherwise, the determining unit determines that the auxiliary information does not need to be reported newly in the destination cell; and In a sixth approach, the determining unit receives a point of time, transmitted by the source base station, when the source base station transmits a handover request to the destination base station; and judges whether a point of time when the auxiliary information is transmitted to the source base station is later than the point of time when the source base station transmits the handover request to the destination base station, and if so, then the determining unit determines that the auxiliary information needs to be reported newly in the destination cell; otherwise, the determining unit determines that the auxiliary information does not need to be reported newly in the destination cell.

Furthermore the determining unit 31 is configured:

In the second approach, if the handover measurement report has been made to the source base station before the auxiliary information is reported to the source base station, to start the auxiliary information forward judgment timer according to the configuration information of the auxiliary information forward judgment timer.

Furthermore the determining unit 31 is configured:

In the first approach, to receive one piece of indication signaling transmitted by the source base station, where the indication signaling indicates whether the respective pieces of auxiliary information reported by the user equipment to the source base station before the source base station transmits the handover command are forwarded by the source base station to the destination base station, or indicates whether the user equipment needs to report newly the lastly reported respective pieces of auxiliary information in the destination cell; or To receive a plurality of pieces of indication signaling transmitted by the source base station, where each piece of indication signaling indicates respectively whether the piece of auxiliary information reported by the user equipment to the source base station before the source base station transmits the handover command is forwarded by the source base station to the destination base station, or indicates whether the user equipment needs to report newly the lastly reported piece of auxiliary information in the destination cell.

Furthermore in the second approach, the configuration information of the auxiliary information forward judgment timer is transmitted in advance by the source base station to the user equipment or defined by a protocol;

In the fourth approach, the length of time of the preset period of time is transmitted in advance by the source base station to the user equipment or defined by a protocol; and In the fifth approach, the preset value of time is transmitted in advance by the source base station to the user equipment or defined by a protocol.

Furthermore the configuration information of the auxiliary information forward judgment timer is transmitted in advance by the source base station to the user equipment in broadcast signaling or dedicated signaling;

The length of time of the preset period of time is transmitted in advance by the source base station to the user equipment in broadcast signaling or dedicated signaling; and The preset value of time is transmitted in advance by the source base station to the user equipment in broadcast signaling or dedicated signaling.

Furthermore in the sixth approach, the point of time when the source base station transmits the handover request to the destination base station is transmitted by the source base station to the user equipment in dedicated signaling or new RRC signaling.

Furthermore the reporting unit 30 is further configured to report auxiliary information related capability indication information to the source base station, before the auxiliary information is reported to the source base station, to notify the source base station of whether the user equipment has the capability to report the auxiliary information.

Furthermore the auxiliary information includes auxiliary information of an eDDA or auxiliary information of an eMBMS or auxiliary information of IDC.

Based upon the same inventive idea, an embodiment of the invention further provides a base station, and since the base station addresses the problem under a principle similar to the method for transmitting information according to the embodiment of the invention, reference can be made to the implementation of the method for an implementation of the base station, so a repeated description thereof will be omitted here.

Figure 4:
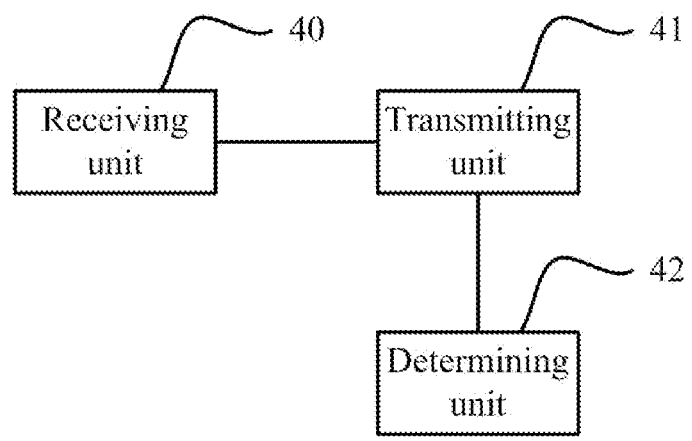
FIG. 4 illustrates a schematic structural diagram of a first base station according to an embodiment of the invention.

Referring to FIG. 4, an embodiment of the invention provides a base station including:

A receiving unit 40 is configured to receive auxiliary information reported by a user equipment; and A transmitting unit 41 is configured to transmit information to the user equipment for the user equipment to determine whether the auxiliary information needs to be reported newly in a destination cell.

Furthermore the transmitting unit 41 is configured:

To transmit indication signaling to the user equipment, upon reception of a handover command transmitted by a destination base station, to indicate whether the respective pieces of auxiliary information reported by the user equipment to the base station before the base station transmits the handover command are forwarded by the base station to the destination base station, or to indicate whether the user equipment needs to report newly the lastly reported auxiliary information in the destination cell; or To transmit configuration information of an auxiliary information forward judgment timer to the user equipment, so that the user equipment starts the auxiliary information forward judgment timer according to the configuration information after the auxiliary information is reported, and determines whether the auxiliary information needs to be reported newly in the destination cell dependent upon whether the auxiliary information forward judgment timer expires upon reception of a handover command;

To transmit information about the length of time of a preset period of time to the user equipment, so that the user equipment determines whether the auxiliary information needs to be reported newly in the destination cell dependent upon whether the auxiliary information is reported after the handover measurement report has been made to the base station for the preset period of time and before a handover command transmitted by the base station is received; or To transmit a preset value of time to the user equipment, so that the user equipment determines whether the auxiliary information needs to be reported newly in the destination cell dependent upon whether the difference between a point of time when a handover command is received, and a point of time when the auxiliary information is reported to the base station is less than the preset value of time; or To transmit to the user equipment a point of time when the base station transmits a handover request to the destination base station, after the handover request is transmitted to the destination base station, so that the user equipment determines whether the auxiliary information needs to be reported newly in the destination cell dependent upon whether a point of time when the auxiliary information is transmitted to the base station is later than the point of time when the base station transmits the handover request to the destination base station.

Furthermore the transmitting unit 41 is configured:

To transmit the indication signaling to the user equipment particularly by transmitting one piece of indication signaling, which indicates whether the respective pieces of auxiliary information reported by the user equipment to the base station before the base station transmits the handover command are forwarded by the base station to the destination base station, or indicates whether the user equipment needs to report newly the lastly reported respective pieces of auxiliary information in the destination cell; or To transmit the indication signaling to the user equipment particularly by transmitting a plurality of pieces of indication signaling, each of which indicates respectively whether the piece of auxiliary information reported by the user equipment to the base station before the base station transmits the handover command is forwarded by the base station to the destination base station, or indicates whether the user equipment needs to report newly the lastly reported piece of auxiliary information in the destination cell.

Furthermore the transmitting unit 41 is further configured:

To transmit the configuration information of the auxiliary information forward judgment timer to the user equipment in broadcast signaling or dedicated signaling;

To transmit the length of time of the preset period of time to the user equipment in broadcast signaling or dedicated signaling;

To transmit the preset value of time to the user equipment in broadcast signaling or dedicated signaling;

To transmit the point of time when the base station transmits the handover request to the destination base station to the user equipment in dedicated signaling or new RRC signaling.

Furthermore the base station further includes:

A determining unit 42 is configured, before the information is transmitted to the user equipment for the user equipment to determine whether the auxiliary information needs to be reported newly in the destination cell, to receive auxiliary information related capability indication information reported by the user equipment, and to determine that the user equipment has the capability to report the auxiliary information, according to the auxiliary information related capability indication information or when the user equipment has ever reported the auxiliary information.

Furthermore the auxiliary information includes auxiliary information of an eDDA or auxiliary information of an eMBMS or auxiliary information of IDC.

Figure 5:
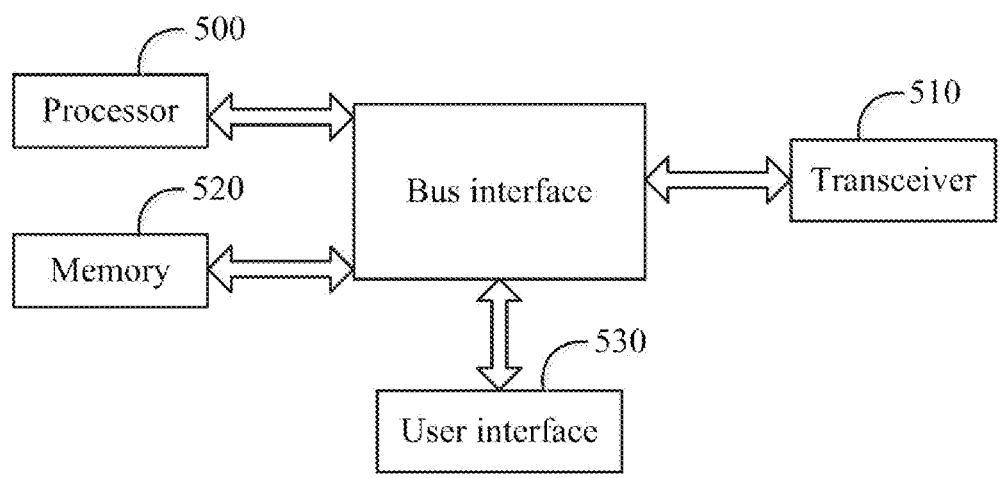
FIG. 5 illustrates a schematic structural diagram of a second user equipment according to an embodiment of the invention.

As illustrated in FIG. 5, another user equipment according to an embodiment of the invention includes:

A processor 500 is configured to report auxiliary information to a source base station through a transceiver 510, to determine whether the auxiliary information needs to be reported newly in a destination cell, and if it is determined that the auxiliary information needs to be reported newly in the destination cell, to report the auxiliary information to a destination base station through the transceiver 510 after the user equipment is switched to the destination cell; and The transceiver 510 is configured to transmit and receive data under the control of the processor 500.

Furthermore the processor 500 is configured to determine whether the auxiliary information needs to be reported newly in the destination cell in one of the following six approaches:

In a first approach, the processor receives indication signaling transmitted by the source base station, where the indication signaling indicates whether the auxiliary information reported by the user equipment to the source base station before the source base station transmits a handover command is forwarded by the source base station to the destination base station, or indicates whether the user equipment needs to report the lastly reported auxiliary information newly in the destination cell; and the processor determines from the indication signaling whether the auxiliary information needs to be reported newly in the destination cell;

In a second approach, the processor starts an auxiliary information forward judgment timer according to configuration information of the auxiliary information forward judgment timer after the auxiliary information is reported to the source base station; and judges whether the auxiliary information forward judgment timer expires when a handover command transmitted by the source base station is received, and if the timer expires, then the processor determines that the auxiliary information does not need to be reported newly in the destination cell; otherwise, the processor determines that the auxiliary information needs to be reported newly in the destination cell;

In a third approach, if the auxiliary information is auxiliary information reported by the user equipment after a handover measurement report is made to the source base station and before a handover command transmitted by the source base station is received, then the processor determines that the auxiliary information needs to be reported newly in the destination cell; otherwise, the processor determines that the auxiliary information does not need to be reported newly in the destination cell;

In a fourth approach, if the auxiliary information is auxiliary information reported by the user equipment after a handover measurement report has been made to the source base station for a preset period of time and before a handover command transmitted by the source base station is received, then the processor determines that the auxiliary information needs to be reported newly in the destination cell; otherwise, the processor determines that the auxiliary information does not need to be reported newly in the destination cell;

In a fifth approach, the processor judges whether the difference between a point of time when a handover command is received, and a point of time when the auxiliary information is reported to the source base station is less than a preset value of time, and if so, then the processor determines that the auxiliary information needs to be reported newly in the destination cell; otherwise, the processor determines that the auxiliary information does not need to be reported newly in the destination cell; and In a sixth approach, the processor receives a point of time, transmitted by the source base station, when the source base station transmits a handover request to the destination base station; and judges whether a point of time when the auxiliary information is transmitted to the source base station is later than the point of time when the source base station transmits the handover request to the destination base station, and if so, then the processor determines that the auxiliary information needs to be reported newly in the destination cell; otherwise, the processor determines that the auxiliary information does not need to be reported newly in the destination cell.

Furthermore the processor 500 is configured:

In the second approach, if the handover measurement report has been made to the source base station before the auxiliary information is reported to the source base station, to start the auxiliary information forward judgment timer according to the configuration information of the auxiliary information forward judgment timer.

Furthermore the processor 500 is configured:

In the first approach, to receive one piece of indication signaling transmitted by the source base station, where the indication signaling indicates whether the respective pieces of auxiliary information reported by the user equipment to the source base station before the source base station transmits the handover command are forwarded by the source base station to the destination base station, or indicates whether the user equipment needs to report newly the lastly reported respective pieces of auxiliary information in the destination cell; or To receive a plurality of pieces of indication signaling transmitted by the source base station, where each piece of indication signaling indicates respectively whether the piece of auxiliary information reported by the user equipment to the source base station before the source base station transmits the handover command is forwarded by the source base station to the destination base station, or indicates whether the user equipment needs to report newly the lastly reported piece of auxiliary information in the destination cell.

Furthermore in the second approach, the configuration information of the auxiliary information forward judgment timer is transmitted in advance by the source base station to the user equipment or defined by a protocol;

In the fourth approach, the length of time of the preset period of time is transmitted in advance by the source base station to the user equipment or defined by a protocol; and In the fifth approach, the preset value of time is transmitted in advance by the source base station to the user equipment or defined by a protocol.

Furthermore the configuration information of the auxiliary information forward judgment timer is transmitted in advance by the source base station to the user equipment in broadcast signaling or dedicated signaling;

The length of time of the preset period of time is transmitted in advance by the source base station to the user equipment in broadcast signaling or dedicated signaling; and The preset value of time is transmitted in advance by the source base station to the user equipment in broadcast signaling or dedicated signaling.

Furthermore in the sixth approach, the point of time when the source base station transmits the handover request to the destination base station is transmitted by the source base station to the user equipment in dedicated signaling or new RRC signaling.

Furthermore the processor 500 is further configured to report auxiliary information related capability indication information to the source base station through the transceiver 510, before the auxiliary information is reported to the source base station, to notify the source base station of whether the user equipment has the capability to report the auxiliary information.

Furthermore the auxiliary information includes auxiliary information of an eDDA or auxiliary information of an eMBMS or auxiliary information of IDC.

Where in FIG. 5, the bus architecture can include any number of interconnected buses and bridges and particularly link together one or more processors represented by the processor 500, one or more memories represented by the memory 520, and various other circuits. The bus architecture can further link together various other circuits, e.g., peripheral devices, a voltage regulator, a power management circuit, etc., and all these circuits are well known in the art, so a further description thereof will be omitted in this context. The bus interface serves as an interface. The transceiver 510 can include a number of elements including a transmitter and a receiver serving as elements configured to communicate with various other devices over a transmission medium. For different user devices, the user interface 530 can also be an interface connected with an internal or external device as needed, and the connected device can include but will not be limited to a keypad, a display, a speaker, a microphone, a joy stick, etc.

The processor 500 is responsible for managing the bus architecture and performing other normal processes, and the memory 520 can store data used by the processor 500 in performing the operations.

Figure 6:
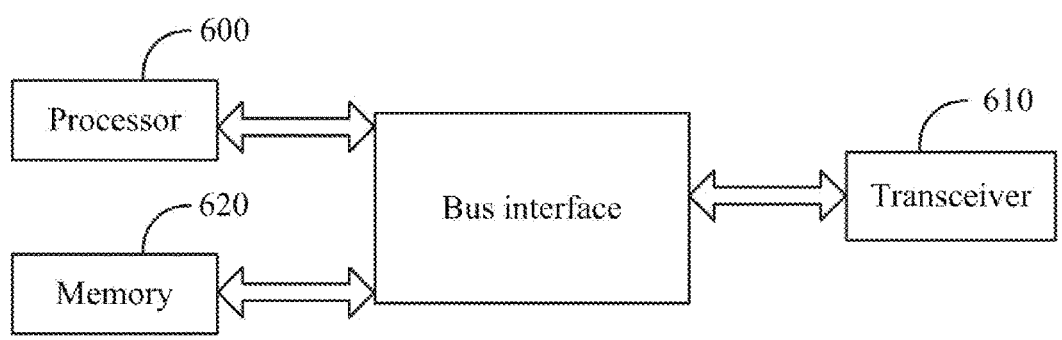
FIG. 6 illustrates a schematic structural diagram of a second base station according to an embodiment of the invention.

As illustrated in FIG. 6, an embodiment of the invention provides another base station including:

A processor 600 is configured to receive through a transceiver 610 auxiliary information reported by a user equipment and to transmit information to the user equipment through the transceiver 610 for the user equipment to determine whether the auxiliary information needs to be reported newly in a destination cell; and The transceiver 610 is configured to transmit and receive data under the control of the processor 600.

Furthermore the processor 600 is configured:

To transmit indication signaling to the user equipment through the transceiver 610, upon reception of a handover command transmitted by a destination base station through the transceiver 610, to indicate whether the respective pieces of auxiliary information reported by the user equipment to the base station before the base station transmits the handover command are forwarded by the base station to the destination base station, or to indicate whether the user equipment needs to report newly the lastly reported auxiliary information in the destination cell; or To transmit configuration information of an auxiliary information forward judgment timer to the user equipment through the transceiver 610, so that the user equipment starts the auxiliary information forward judgment timer according to the configuration information after the auxiliary information is reported, and determines whether the auxiliary information needs to be reported newly in the destination cell dependent upon whether the auxiliary information forward judgment timer expires upon reception of a handover command; or To transmit information about the length of time of a preset period of time to the user equipment through the transceiver 610, so that the user equipment determines whether the auxiliary information needs to be reported newly in the destination cell dependent upon whether the auxiliary information is reported after the handover measurement report has been made to the base station for the preset period of time and before a handover command transmitted by the base station is received; or To transmit a preset value of time to the user equipment through the transceiver 610, so that the user equipment determines whether the auxiliary information needs to be reported newly in the destination cell dependent upon whether the difference between a point of time when a handover command is received, and a point of time when the auxiliary information is reported to the base station is less than the preset value of time; or To transmit to the user equipment through the transceiver 610 a point of time when the base station transmits a handover request to the destination base station, after the handover request is transmitted to the destination base station through the transceiver 610, so that the user equipment determines whether the auxiliary information needs to be reported newly in the destination cell dependent upon whether a point of time when the auxiliary information is transmitted to the base station is later than the point of time when the base station transmits the handover request to the destination base station.

Furthermore the processor 600 is configured:

To transmit the indication signaling to the user equipment through the transceiver 610 particularly by transmitting one piece of indication signaling, which indicates whether the respective pieces of auxiliary information reported by the user equipment to the base station before the base station transmits the handover command are forwarded by the base station to the destination base station, or indicates whether the user equipment needs to report newly the lastly reported respective pieces of auxiliary information in the destination cell; or To transmit the indication signaling to the user equipment through the transceiver 610 particularly by transmitting a plurality of pieces of indication signaling, each of which indicates respectively whether the piece of auxiliary information reported by the user equipment to the base station before the base station transmits the handover command is forwarded by the base station to the destination base station, or indicates whether the user equipment needs to report newly the lastly reported piece of auxiliary information in the destination cell.

Furthermore the processor 600 is further configured:

To transmit the configuration information of the auxiliary information forward judgment timer to the user equipment through the transceiver 610 in broadcast signaling or dedicated signaling;

To transmit the length of time of the preset period of time to the user equipment through the transceiver 610 in broadcast signaling or dedicated signaling;

To transmit the preset value of time to the user equipment through the transceiver 610 in broadcast signaling or dedicated signaling;

To transmit the point of time when the base station transmits the handover request to the destination base station to the user equipment through the transceiver 610 in dedicated signaling or new RRC signaling.

Furthermore the processor 600 is further configured:

Before the information is transmitted to the user equipment through the transceiver 610 for the user equipment to determine whether the auxiliary information needs to be reported newly in the destination cell, to receive auxiliary information related capability indication information reported by the user equipment through the transceiver 610 and to determine that the user equipment has the capability to report the auxiliary information, according to the auxiliary information related capability indication information or when the user equipment has ever reported the auxiliary information.

Furthermore the auxiliary information includes auxiliary information of an eDDA or auxiliary information of an eMBMS or auxiliary information of IDC.

Where in FIG. 6, the bus architecture can include any number of interconnected buses and bridges and particularly link together one or more processors represented by the processor 600, one or more memories represented by the memory 620, and various other circuits. The bus architecture can further link together various other circuits, e.g., peripheral devices, a voltage regulator, a power management circuit, etc., and all these circuits are well known in the art, so a further description thereof will be omitted in this context. The bus interface serves as an interface. The transceiver 610 can include a number of elements including a transmitter and a receiver serving as elements configured to communicate with various other devices over a transmission medium. The processor 600 is responsible for managing the bus architecture and performing other normal processes, and the memory 620 can store data used by the processor 600 in performing the operations.

The processor 600 is responsible for managing the bus architecture and performing other normal processes, and the memory 620 can store data used by the processor 600 in performing the operations.

In summary, the invention has the following advantageous effects:

In the solutions according to the embodiments of the invention, the user equipment reports the auxiliary information to the source base station, the user equipment determines whether the auxiliary information needs to be reported newly in the destination cell, and if the user equipment determines that the auxiliary information needs to be reported newly in the destination cell, then the user equipment reports the auxiliary information to the destination base station after being switched to the destination cell. Apparently in this solution, the user equipment needs to determine whether the auxiliary information reported to the source base station needs to be reported newly in the destination cell, and if so, then the user equipment reports the auxiliary information to the destination base station in the destination cell, so that the destination base station can obtain the latest auxiliary information of the user equipment to provide the user equipment with the most reasonable configuration.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for reporting auxiliary information, the method comprising:
    reporting, by a user equipment, auxiliary information to a source base station;
    determining, by the user equipment, whether the auxiliary information needs to be reported again in a destination cell; and
    if it is determined that the auxiliary information needs to be reported again in the destination cell, then reporting, by the user equipment, the auxiliary information to a destination base station after the user equipment is switched to the destination cell;
    wherein the user equipment determines whether the auxiliary information needs to be reported again in the destination cell in one of the following six approaches:
    in a first approach, the user equipment receives indication signaling transmitted by the source base station, wherein the indication signaling indicates whether the auxiliary information reported by the user equipment to the source base station before the source base station transmits a handover command is forwarded by the source base station to the destination base station, or indicates whether the user equipment needs to report again the lastly reported auxiliary information in the destination cell; and the user equipment determines from the indication signaling whether the lastly reported auxiliary information needs to be reported again in the destination cell;
    in a second approach, the user equipment starts an auxiliary information forward judgment timer according to configuration information of the auxiliary information forward judgment timer after the auxiliary information is reported to the source base station; and judges whether the auxiliary information forward judgment timer expires when a handover command transmitted by the source base station is received, and if the timer expires, then the user equipment determines that the auxiliary information does not need to be reported again in the destination cell; otherwise, the user equipment determines that the auxiliary information needs to be reported again in the destination cell;
    in a third approach, if the auxiliary information is auxiliary information reported by the user equipment after a handover measurement report is made to the source base station and before a handover command transmitted by the source base station is received, then the user equipment determines that the auxiliary information needs to be reported again in the destination cell; otherwise, the user equipment determines that the auxiliary information does not need to be reported again in the destination cell;
    in a fourth approach, if the auxiliary information is auxiliary information reported by the user equipment after a handover measurement report has been made to the source base station for a preset period of time and before a handover command transmitted by the source base station is received, then the user equipment determines that the auxiliary information needs to be reported again in the destination cell; otherwise, the user equipment determines that the auxiliary information does not need to be reported again in the destination cell;
    in a fifth approach, the user equipment judges whether the difference between a point of time when a handover command is received, and a point of time when the auxiliary information is reported to the source base station is less than a preset value of time, and if so, then the user equipment determines that the auxiliary information needs to be reported again in the destination cell; otherwise, the user equipment determines that the auxiliary information does not need to be reported again in the destination cell; and
    in a sixth approach, the user equipment receives a point of time, transmitted by the source base station, when the source base station transmits a handover request to the destination base station; and judges whether a point of time when the auxiliary information is transmitted to the source base station is later than the point of time when the source base station transmits the handover request to the destination base station, and if so, then the user equipment determines that the auxiliary information needs to be reported again in the destination cell;
    otherwise, the user equipment determines that the auxiliary information does not need to be reported again in the destination cell.

2. The method according to claim 1, wherein in the second approach, starting the auxiliary information forward judgment timer according to the configuration information of the auxiliary information forward judgment timer comprises:
    if a handover measurement report has been made to the source base station before the auxiliary information is reported to the source base station, then starting, by the user equipment, the auxiliary information forward judgment timer according to the configuration information of the auxiliary information forward judgment timer.

3. The method according to claim 1, wherein in the first approach, the user equipment receives one piece of indication signaling transmitted by the source base station, wherein the indication signaling indicates whether the respective pieces of auxiliary information reported by the user equipment to the source base station before the source base station transmits the handover command are forwarded by the source base station to the destination base station, or indicates whether the user equipment needs to report again the lastly reported respective pieces of auxiliary information in the destination cell; or
    the user equipment receives a plurality of pieces of indication signaling transmitted by the source base station, wherein each piece of indication signaling indicates respectively whether the piece of auxiliary information reported by the user equipment to the source base station before the source base station transmits the handover command is forwarded by the source base station to the destination base station, or indicates whether the user equipment needs to report again the lastly reported piece of auxiliary information in the destination cell.

4. The method according to claim 1, wherein in the second approach, the configuration information of the auxiliary information forward judgment timer is transmitted in advance by the source base station to the user equipment or defined by a protocol;
   in the fourth approach, the length of time of the preset period of time is transmitted in advance by the source base station to the user equipment or defined by a protocol; and
   in the fifth approach, the preset value of time is transmitted in advance by the source base station to the user equipment or defined by a protocol.

5. The method according to claim 4, wherein the configuration information of the auxiliary information forward judgment timer is transmitted in advance by the source base station to the user equipment in broadcast signaling or dedicated signaling;
   the length of time of the preset period of time is transmitted in advance by the source base station to the user equipment in broadcast signaling or dedicated signaling; and
   the preset value of time is transmitted in advance by the source base station to the user equipment in dedicated signaling or broadcast signaling.

6. The method according to claim 1, wherein in the sixth approach, the point of time when the source base station transmits the handover request to the destination base station is transmitted by the source base station to the user equipment in dedicated signaling or new RRC signaling.

7. The method according to claim 5, wherein before the user equipment reports the auxiliary information to the source base station, the method further comprises:
   reporting, by the user equipment, auxiliary information related capability indication information to the source base station to notify the source base station of whether the user equipment has the capability to report the auxiliary information.

8. The method according to claim 1, wherein the auxiliary information comprises auxiliary information of an eDDA or auxiliary information of an eMBMS or auxiliary information of IDC.

9. A method for transmitting information, the method comprising:
   receiving, by a source base station, auxiliary information reported by a user equipment; and
   transmitting, by the source base station, information to the user equipment for the user equipment to determine whether the auxiliary information needs to be reported again in a destination cell;
   wherein transmitting, by the source base station, the information to the user equipment for the user equipment to determine whether the auxiliary information needs to be reported again in the destination cell comprises:
   transmitting, by the source base station, indication signaling to the user equipment, upon reception of a handover command transmitted by a destination base station, to indicate whether the respective pieces of auxiliary information reported by the user equipment to the source base station before the source base station transmits the handover command are forwarded by the source base station to the destination base station, or to indicate whether the user equipment needs to report again the lastly reported auxiliary information in the destination cell; or
   transmitting, by the source base station, configuration information of an auxiliary information forward judgment timer to the user equipment, so that the user equipment starts the auxiliary information forward judgment timer according to the configuration information after the auxiliary information is reported, and determines whether the auxiliary information needs to be reported again in the destination cell dependent upon whether the auxiliary information forward judgment timer expires upon reception of a handover command; or
   transmitting, by the source base station, information about the length of time of a preset period of time to the user equipment, so that the user equipment determines whether the auxiliary information needs to be reported again in the destination cell dependent upon whether the auxiliary information is reported after a handover measurement report has been made to the source base station for the preset period of time and before a handover command transmitted by the source base station is received; or
   transmitting, by the source base station, a preset value of time to the user equipment, so that the user equipment determines whether the auxiliary information needs to be reported again in the destination cell dependent upon whether the difference between a point of time when a handover command is received, and a point of time when the auxiliary information is reported to the source base station is less than the preset value of time; or
   transmitting, by the source base station, to the user equipment a point of time when the source base station transmits a handover request to the destination base station, after the handover request is transmitted to the destination base station, so that the user equipment determines whether the auxiliary information needs to be reported again in the destination cell dependent upon whether a point of time when the auxiliary information is transmitted to the source base station is later than the point of time when the source base station transmits the handover request to the destination base station.

10. A user equipment, comprising:
   a reporting unit configured to report auxiliary information to a source base station;
   a determining unit configured to determine whether the auxiliary information needs to be reported again in a destination cell; and
   a again-reporting unit configured, if it is determined that the auxiliary information needs to be reported again in the destination cell, to report the auxiliary information to a destination base station after the user equipment is switched to the destination cell;
   wherein the determining unit is configured to determine whether the auxiliary information needs to be reported again in the destination cell in one of the following six approaches:
   in a first approach, the determining unit receives indication signaling transmitted by the source base station, wherein the indication signaling indicates whether the auxiliary information reported by the user equipment to the source base station before the source base station transmits a handover command is forwarded by the source base station to the destination base station, or indicates whether the user equipment needs to report again the lastly reported auxiliary information in the destination cell; and the determining unit determines from the indication signaling whether the lastly reported auxiliary information needs to be reported again in the destination cell;

in a second approach, the determining unit starts an auxiliary information forward judgment timer according to configuration information of the auxiliary information forward judgment timer after the auxiliary information is reported to the source base station; and judges whether the auxiliary information forward judgment timer expires when a handover command transmitted by the source base station is received, and if the timer expires, then the determining unit determines that the auxiliary information does not need to be reported again in the destination cell; otherwise, the determining unit determines that the auxiliary information needs to be reported again in the destination cell;

in a third approach, if the auxiliary information is auxiliary information reported by the user equipment after a handover measurement report is made to the source base station and before a handover command transmitted by the source base station is received, then the determining unit determines that the auxiliary information needs to be reported again in the destination cell; otherwise, the determining unit determines that the auxiliary information does not need to be reported again in the destination cell;

in a fourth approach, if the auxiliary information is auxiliary information reported by the user equipment after a handover measurement report has been made to the source base station for a preset period of time and before a handover command transmitted by the source base station is received, then the determining unit determines that the auxiliary information needs to be reported again in the destination cell; otherwise, the determining unit determines that the auxiliary information does not need to be reported again in the destination cell;

in a fifth approach, the determining unit judges whether the difference between a point of time when a handover command is received, and a point of time when the auxiliary information is reported to the source base station is less than a preset value of time, and if so, then the determining unit determines that the auxiliary information needs to be reported again in the destination cell; otherwise, the determining unit determines that the auxiliary information does not need to be reported again in the destination cell; and in a sixth approach, the determining unit receives a point of time, transmitted by the source base station, when the source base station transmits a handover request to the destination base station; and judges whether a point of time when the auxiliary information is transmitted to the source base station is later than the point of time when the source base station transmits the handover request to the destination base station, and if so, then the determining unit determines that the auxiliary information needs to be reported again in the destination cell;

otherwise, the determining unit determines that the auxiliary information does not need to be reported again in the destination cell.

11. The user equipment according to claim 10, wherein the determining unit is configured:

in the second approach, if a handover measurement report has been made to the source base station before the auxiliary information is reported to the source base station, to start the auxiliary information forward judgment timer according to the configuration information of the auxiliary information forward judgment timer.

12. The user equipment according to claim 10, wherein the determining unit is configured:

in the first approach, to receive one piece of indication signaling transmitted by the source base station, wherein the indication signaling indicates whether the respective pieces of auxiliary information reported by the user equipment to the source base station before the source base station transmits the handover command are forwarded by the source base station to the destination base station, or indicates whether the user equipment needs to report again the lastly reported respective pieces of auxiliary information in the destination cell; or to receive a plurality of pieces of indication signaling transmitted by the source base station, wherein each piece of indication signaling indicates respectively whether the piece of auxiliary information reported by the user equipment to the source base station before the source base station transmits the handover command is forwarded by the source base station to the destination base station, or indicates whether the user equipment needs to report again the lastly reported piece of auxiliary information in the destination cell.

13. The user equipment according to claim 10, wherein in the second approach, the configuration information of the auxiliary information forward judgment timer is transmitted in advance by the source base station to the user equipment or defined by a protocol;

in the fourth approach, the length of time of the preset period of time is transmitted in advance by the source base station to the user equipment or defined by a protocol; and in the fifth approach, the preset value of time is transmitted in advance by the source base station to the user equipment or defined by a protocol.

14. The user equipment according to claim 13, wherein the configuration information of the auxiliary information forward judgment timer is transmitted in advance by the source base station to the user equipment in broadcast signaling or dedicated signaling;

the length of time of the preset period of time is transmitted in advance by the source base station to the user equipment in broadcast signaling or dedicated signaling; and the preset value of time is transmitted in advance by the source base station to the user equipment in dedicated signaling or broadcast signaling.

15. The user equipment according to claim 10, wherein in the sixth approach, the point of time when the source base station transmits the handover request to the destination base station is transmitted by the source base station to the user equipment in dedicated signaling or new RRC signaling.

16. The user equipment according to claim 14, wherein the reporting unit is further configured to report auxiliary information related capability indication information to the source base station, before the auxiliary information is reported to the source base station, to notify the source base station of whether the user equipment has the capability to report the auxiliary information.

17. The user equipment according to claim 10, wherein the auxiliary information comprises auxiliary information of an eDDA or auxiliary information of an eMBMS or auxiliary information of IDC.

18. A base station, comprising:

a receiving unit configured to receive auxiliary information reported by a user equipment; and a transmitting unit configured to transmit information to the user equipment for the user equipment to determine whether the auxiliary information needs to be reported again in a destination cell;

wherein the transmitting unit is configured:

to transmit indication signaling to the user equipment, upon reception of a handover command transmitted by a destination base station, to indicate whether the respective pieces of auxiliary information reported by the user equipment to the base station before the base station transmits the handover command are forwarded by the base station to the destination base station, or to indicate whether the user equipment needs to report again the lastly reported auxiliary information in the destination cell; or to transmit configuration information of an auxiliary information forward judgment timer to the user equipment, so that the user equipment starts the auxiliary information forward judgment timer according to the configuration information after the auxiliary information is reported, and determines whether the auxiliary information needs to be reported again in the destination cell dependent upon whether the auxiliary information forward judgment timer expires upon reception of a handover command; or to transmit information about the length of time of a preset period of time to the user equipment, so that the user equipment determines whether the auxiliary information needs to be reported again in the destination cell dependent upon whether the auxiliary information is reported after a handover measurement report has been made to the source base station for the preset period of time and before a handover command transmitted by the base station is received; or to transmit a preset value of time to the user equipment, so that the user equipment determines whether the auxiliary information needs to be reported again in the destination cell dependent upon whether the difference between a point of time when a handover command is received, and a point of time when the auxiliary information is reported to the base station is less than the preset value of time; or to transmit to the user equipment a point of time when the base station transmits a handover request to the destination base station, after the handover request is transmitted to the destination base station, so that the user equipment determines whether the auxiliary information needs to be reported again in the destination cell dependent upon whether a point of time when the auxiliary information is transmitted to the base station is later than the point of time when the base station transmits the handover request to the destination base station.

* * * * *